United States Patent
Zafari

(10) Patent No.: US 9,595,774 B2
(45) Date of Patent: Mar. 14, 2017

(54) METALLISATION OF A HOUSING OF AN AERONAUTIC ENGINE MADE OF ELECTRICALLY INSULATING MATERIAL

(71) Applicant: SNECMA, Paris (FR)

(72) Inventor: Murtaza Hussain Zafari, Moissy-Cramayel (FR)

(73) Assignee: SNECMA, Paris (FR)

( * ) Notice: Subject to any disclaimer, the term of this patent is extended or adjusted under 35 U.S.C. 154(b) by 287 days.

(21) Appl. No.: 14/528,486

(22) Filed: Oct. 30, 2014

(65) Prior Publication Data

US 2015/0114677 A1 Apr. 30, 2015

(30) Foreign Application Priority Data

Oct. 30, 2013 (FR) ..................................... 13 60639

(51) Int. Cl.

| | | |
|---|---|---|
| *H05K 5/00* | (2006.01) | |
| *H05K 7/00* | (2006.01) | |
| *H01R 4/64* | (2006.01) | |
| *F01D 25/28* | (2006.01) | |
| *F02C 7/32* | (2006.01) | |
| *H02G 3/08* | (2006.01) | |

(52) U.S. Cl.
CPC ............. *H01R 4/64* (2013.01); *F01D 25/28* (2013.01); *F02C 7/32* (2013.01); *H02G 3/081* (2013.01)

(58) Field of Classification Search
CPC ................................. H05K 3/32; H02G 3/088
USPC .................................................. 361/679.01
See application file for complete search history.

(56) References Cited

U.S. PATENT DOCUMENTS

| | | | |
|---|---|---|---|
| 3,710,568 A | 1/1973 | Rice | |
| 5,174,110 A | 12/1992 | Duesler et al. | |
| 5,845,544 A * | 12/1998 | Huggins | ................ F16H 3/095 74/335 |
| 2006/0201135 A1 | 9/2006 | Xie et al. | |
| 2007/0081887 A1 | 4/2007 | Xie et al. | |
| 2008/0206048 A1 | 8/2008 | Coupe et al. | |
| 2009/0298310 A1* | 12/2009 | Nakanishi | ............. H02G 3/088 439/76.2 |
| 2009/0298311 A1* | 12/2009 | Nakanishi | ............. H02G 3/088 439/76.2 |
| 2013/0189868 A1 | 7/2013 | Fitt et al. | |

FOREIGN PATENT DOCUMENTS

| | | |
|---|---|---|
| EP | 1 674 671 A2 | 6/2006 |
| EP | 1 961 923 A2 | 8/2008 |
| FR | 2 933 378 A1 | 1/2010 |

OTHER PUBLICATIONS

French Search Report issued Jul. 31, 2014 in Patent Application No. 1360639 (with English Translation of Category of Cited Documents).

* cited by examiner

*Primary Examiner* — Jerry Wu
(74) *Attorney, Agent, or Firm* — Oblon, McClelland, Maier & Neustadt, L.L.P.

(57) ABSTRACT

The invention relates to an aeronautic engine (1), comprising:
    a housing (10), made of electrically insulating material,
    a first metal piece (2, 3), and
    electrical equipment (30), fixed to the housing (10) and connected to the first metal piece (2, 3) by means of an electrically conductive connection path (16, 18) and a first connecting flange (12, 14) of the housing (10).

5 Claims, 4 Drawing Sheets

METALLISATION OF A HOUSING OF AN AERONAUTIC ENGINE MADE OF ELECTRICALLY INSULATING MATERIAL

CROSS REFERENCE TO RELATED APPLICATION

This application claims priority to French patent Application No. 1360639 filed on Oct. 30, 2013, the entire contents of which are incorporated herein by reference.

FIELD OF THE INVENTION

The invention relates in general to gas turbine engines, and more particularly the metallisation of a fan retention housing of a gas turbine for an aeronautic engine.

TECHNOLOGICAL BACKGROUND

In a gas turbine aeronautic engine, the fan retention housing fulfils several functions. It is formed by a relatively thin metallic wall defining the air inlet in the engine, supports abradable material opposite the tips of the fan blades as well as any absorption structure of sound waves for the acoustic input treatment of the engine, and incorporates or supports a retention shield, at the level of the fan.

Documents EP 1 674 671 and EP 1 961 923 have proposed producing a fan retention housing of composite material, comprising for example a fibrous reinforcement densified by a matrix. The fibrous reinforcement can be formed by a winding in layers superposed on a mandrel of a fibrous texture obtained by three-dimensional weaving with evolutive thickness, to integrate the retention shield by simple localised increase in thickness.

These housings made of composite materials have many advantages, including especially their weight reduced in comparison to equivalent metallic housings. Yet, since the matrix of these composite materials generally comprises material polymer such as resin, they exhibit major electrical resistance and therefore do not adequately conduct electricity to correctly evacuate electric power. However, the electrical equipment of the housing can be subject to an aggressive electromagnetic environment (especially to high-intensity radiated fields (or HIRF), lightning strikes, electromagnetic interference (EMI), etc., in which they must be capable of functioning nominally.

The result is considerable risk of damaging the electrical equipment of the engine, including some computers essential to proper operation of the engine.

Also, when electrical energy cannot be evacuated, it causes a substantial rise in temperature of the housing by joule effect. Composite materials used to make the fan retention housings are limited to a use temperature of generally under a hundred degrees. If this temperature is exceeded, the housing risks melting at least locally or burning (combustion) and no longer being able to support all or some of the electrical equipment which they support.

Document U.S. 2013/189868 has proposed a rigid structure in which several electrical conductors are embedded, to reduce the bulk and weight of the conventional harness and simplify their handling. This document however provides no technical solution for easily evacuating loads and intensities which might be circulating in a housing made of electrically insulating material.

Document U.S. Pat. No. 5,174,110 as such describes the fact that an aeronautic engine includes electric cables for making electrical connections in an aeronautic engine. But, neither does the basic idea of this document improve evacuation of loads and intensities in such a housing.

SUMMARY OF THE INVENTION

An aim of the invention is therefore to propose an aeronautic engine comprising a housing, especially a retention housing for a fan of a gas turbine, made of electrically insulating material such as composite material comprising a fibrous reinforcement densified by a polymer matrix, capable of correctly distributing loads and intensities in the engine irrespective of the electromagnetic environment, and which is also simple to produce at a moderate cost.

For this, the invention proposes an aeronautic engine, comprising:
- a housing,
- a first metal piece, and
- electrical equipment, fixed on the housing and connected to the first metal piece by means of an electrically conductive connection path,
- wherein the housing is made of electrically insulating material and comprises at least one first connecting flange, adapted to fix the housing to the first metal piece, the connection path being connected to the first metal piece by means of said first connecting flange.

Some optional, though non-limiting, characteristics of the aeronautic engine are the following:
**
- the engine further comprises a second metal piece, and:
    - the connection path is also adapted to connect the housing to the second metal piece, and
    - the housing comprises at least one second connecting flange, adapted to fix the housing to the second metal piece, the connection path being connected to the second metal piece by means of said second connecting flange,
- the connection path comprises at least one of the following elements: a metal-metal contact, a ground braid,
- the metal-metal contact comprises a metal support fixed both to the electrical equipment and also to the first connecting flange,
- the electrically insulating material of the housing comprises composite material, said composite material comprising a fibrous reinforcement densified by a polymer matrix,
- at the level of the contact between the metal support of the electrical equipment and the housing, the fibres of the composite material of the housing are at least partially exposed to improve the metal-metal contact between the metal support and the first connecting flange and to improve contact between the connection path (16, 18) and the first connecting flange (12, 14),
- the first metal piece and the second metal piece comprise an intermediate metallic housing and an air inlet sleeve, and
- the electrical equipment comprises at least one of the elements of the following group: a computer, a sensor.

The invention also proposes a housing of an aeronautic engine, especially a fan retention housing, made of electrically insulating material, used in an aeronautic engine as described hereinabove.

Optionally, the electrically insulating material can comprise composite material, said composite material comprising a fibrous reinforcement densified by a polymer matrix.

BRIEF DESCRIPTION OF THE DRAWINGS

Other characteristics, aims and advantages of the present invention will emerge more clearly from the following detailed description, and with respect to the appended drawings given by way of non-limiting examples and in which.

DETAILED DESCRIPTION OF AN EMBODIMENT

Figure 1A:
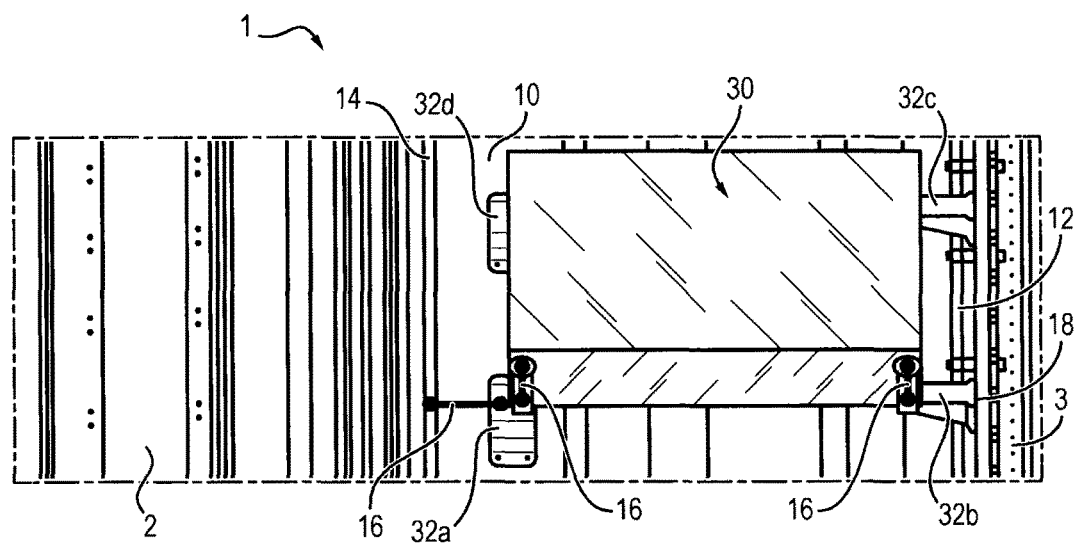
FIGS. 1a, 2a and 3a are detailed views of embodiments of engines according to the invention, each comprising a housing made of insulating material to which electrical equipment is fixed and connected to one or more structural metallic pieces of the engine.

From upstream to downstream in the direction of gas flow a gas turbine engine 1 generally comprises a fan, one or more compressor stages, for example a low-pressure compressor and a high-pressure compressor, a combustion chamber, one or more turbine stages, for example a high-pressure turbine and a low-pressure turbine, and a gas discharge pipe.

The turbines can be coupled to the compressor and the fan by respective coaxial shafts.

The engine 1 is housed inside a housing comprising several parts corresponding to different elements of the engine 1. So, the fan is enclosed for example by a fan retention housing 10 (or fan housing). The fan housing 10 can be made in a single piece and comprises, at the level of its axial ends, flanges 12, 14. A first flange 12, said upstream, enables fixing of an air inlet sleeve 3 to the housing, while the second flange 14, said downstream, enables connection of the fan housing 10 with an intermediate housing 2 by means of linking members of 4-nut screws 5 type, with interposition of an annular spigot applied to each of the flanges upstream and downstream.

The intermediate housing 2 and the air inlet sleeve 3 are made of metal, for example titanium, in metallic alloy based on titanium or aluminium.

In the following, the invention will be described more particularly in terms of the fan housings 10 of a gas turbine engine, made of composite material comprising a fibrous reinforcement densified by an electrically insulating matrix. This is not however limiting, to the extent where the invention applies mutatis mutandis to any engine comprising a housing made of electrically insulating material and able to be used in severe electromagnetic environments.

The fibrous reinforcement of the fan housing 10 comprises fibres, especially carbon, glass, aramide or ceramic. The matrix as such is typically a polymer matrix, for example epoxide, bismaleimide or polyimide.

The reinforcement can be formed by winding on to a mandrel a fibrous texture made by three-dimensional weaving with evolutive thickness as per the description of application FR 2 913 053, the fibrous reinforcement constituting a complete fibrous preform of the fan housing 10 formed in a single piece with reinforcing parts corresponding to the flanges 12, 14.

Electrical equipment 30 can be fixed to the fan housing 10, especially computers or sensors, such as a main computer of the engine EEC (Engine Electronic Control), necessary for activation and control of the engine 1, a thrust reverser computer TRCU (for Thrust Reverser Control Unit), a computer adapted to transform physical signals (pressures, temperatures, debris, etc.) into electrical signals, etc.

For better distribution of loads and intensities in the engine 1, especially in case of an aggressive electromagnetic environment, the electrical equipment 30 is connected to a structural metallic piece of the engine 1, preferably a piece adjacent to the fan housing 10, by means of an electrically conductive connection path.

For example, the electrical equipment 30 can be connected to the upstream flange 12 and/or to the downstream flange 14 of the fan housing 10, which are fixed respectively to the air inlet sleeve 3 and to the intermediate housing 2 of the engine 1, by means of one or more metallic connection paths.

Advantageously, using at least two connection paths (both to the upstream flange 12 and also to the downstream flange 14), demultiplies circulation of the electrical energy, and therefore reduces the intensity of loads and intensities circulating inside a single connection path.

This makes it possible to control propagation of the electric current by multiplying the paths and using conduction via the casing of the electrical equipment 30 (generally metallic) to transfer electrons to the structural metallic pieces of the engine 1. This then eliminates insulation of the fan housing 10 in electrically insulating material and non-degradation of electrical equipment 30, even in a severe electromagnetic environment.

The electrical equipment 30 can each be fixed to one or more metallic supports 32. For example, the electrical equipment 30 can be fixed on four metallic supports 32 which can form four support points, arranged at the level of four corners opposite the electrical equipment 30. As a variant, the electrical equipment 30 can be fixed to two overall elongated metallic supports 32, each extending on either side of the equipment 30.

To allow passage of the current, the electrical equipment 30 and all or some of the metallic supports 32 are preferably connected electrically. This electric connection can especially be set up by way of ground braids 16, fixed between the computer and the metallic supports 32. Ground braid 16 here means an array of electric wires or, alternatively, a very fine metallic part, adapted to join two pieces together to enable evacuation of electrons. As a variant, the electric connection can also be made by means of a reversed current network.

Figure 1B:
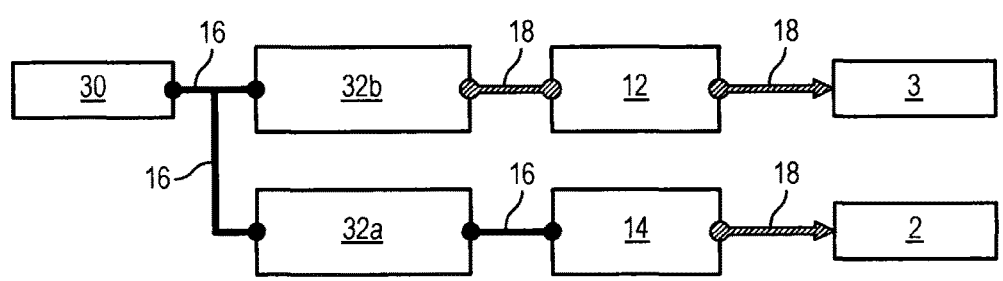
FIGS. 1b, 2b and 3b are diagrams of the electrically conductive connection path between the electrical equipment FIGS. 1a, 2a and 3a respectively and the structural metallic pieces of the engine.

In the embodiment illustrated in FIGS. 1a and 1b, the electrical equipment 30 comprises four metallic supports 32a-32b-32c-32d, arranged at the level of four opposite corners of the equipment 30. In a non-limiting manner, the electrical equipment 30 can be a computer of EEC type. One of the supports, here the lower downstream support 32a, is connected both to the electrical equipment 30 and also to the downstream flange 14 by means of ground braids 16. Another of the metallic supports 32, here the lower upstream support 32b, is connected to the electrical equipment 30 by means of a ground braid 16, and to the upstream flange 12 by a metal-metal contact 18, that is, a mechanical assembly having direct contact between the metal support 32 and the upstream flange 12. The upstream flange 12 and the downstream flange 14 are then connected respectively to the air inlet sleeve 3 and the intermediate housing 2.

By way of variant, the electrical equipment 30 could also be connected to the upper support 32d and/or 32c to demultiply the connection paths.

According to yet another variant, the supports 32a and 32d could be connected to the downstream flange 14 by a metal-metal contact 18, while the connection is made by means of ground braids 16 between the support 32b and/or 32c and the upstream flange 12.

Figure 2A:
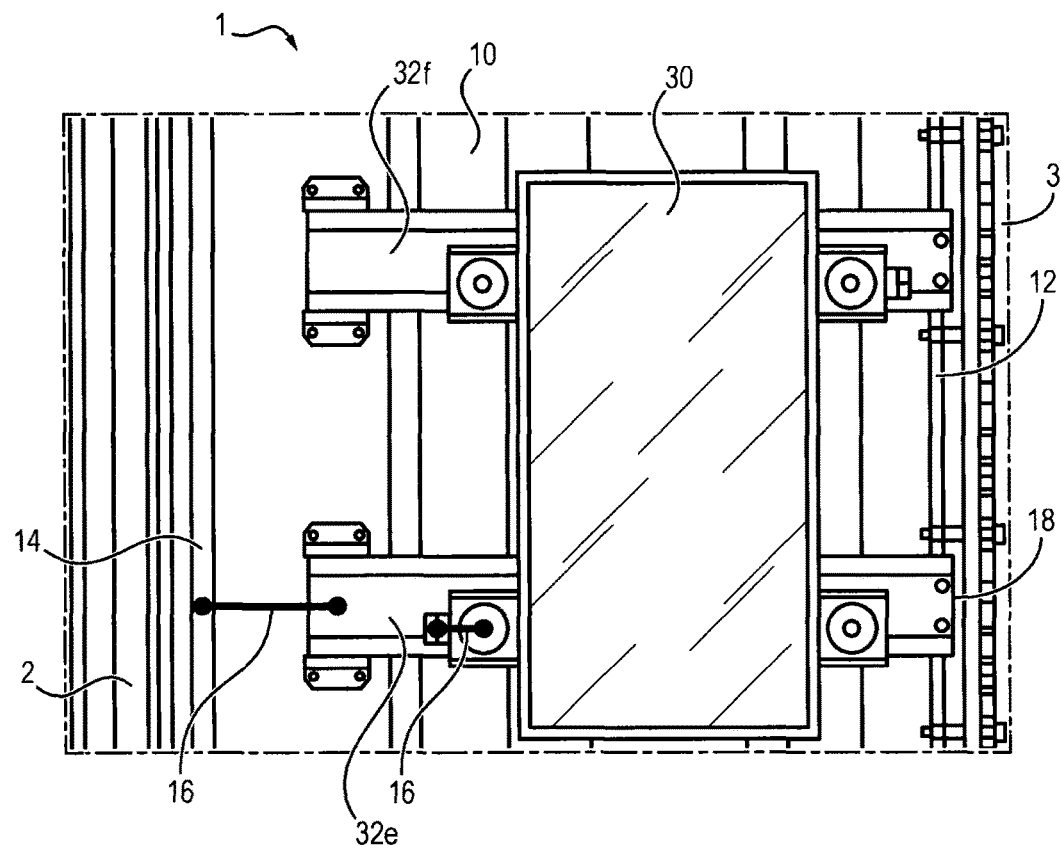
Figure 2B:
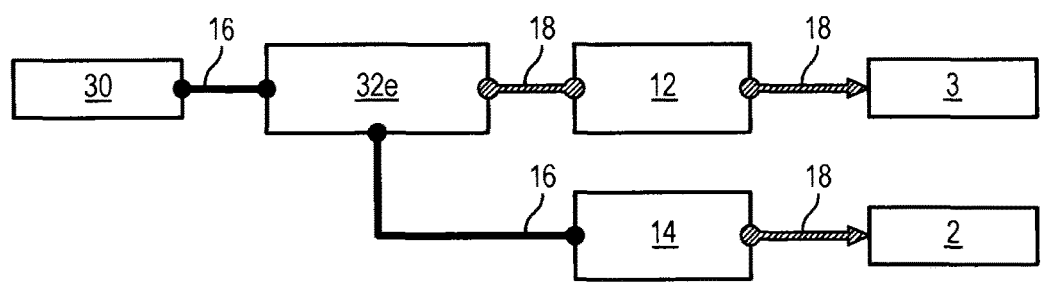

In the embodiment illustrated in FIGS. 2a and 2b, the electrical equipment 30 comprises two elongated electric supports 32e-32f, extending on either side of the equipment 30 to form four electrical contacts. In a non-limiting manner, the electrical equipment 30 can be a computer of TCRU type. Here, the electrical equipment 30 is connected electrically only to one of the two metallic supports 32, the lower support 32e, and it is this same metal support 32e which is connected at the same time to the downstream flange 14, by means of a ground braid 16, and to the upstream flange 12, via a metal contact. Also, the electrical equipment 30 is connected to this metal support 32e by a ground braid 16 at the level of the downstream flange 14 (as illustrated in FIG. 2a), or the upstream flange 12. By way of variant, the electrical equipment 30 could be connected solely to the upper support 32f, or to the two metallic supports 32e, 32f to demultiply the connection paths. The upstream flange 12 and the downstream flange 14 are then connected respectively to the air inlet sleeve 3 and the intermediate housing 2.

By way of variant, the supports 32e-32f could be connected to the downstream flange 14 by a metal-metal contact 18 and to the upstream flange 12 by a ground braid 16.

Figure 3A:
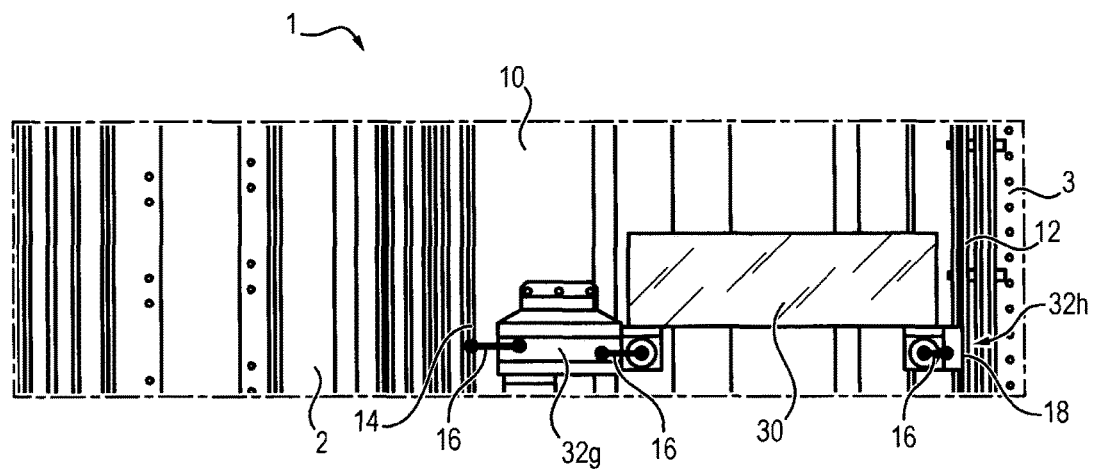
Figure 3B:
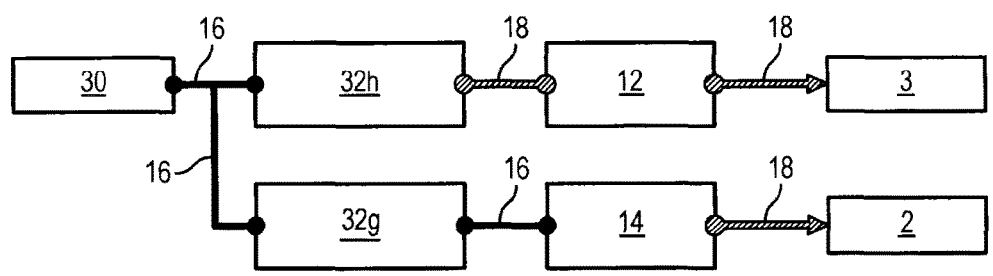
Figure 4:
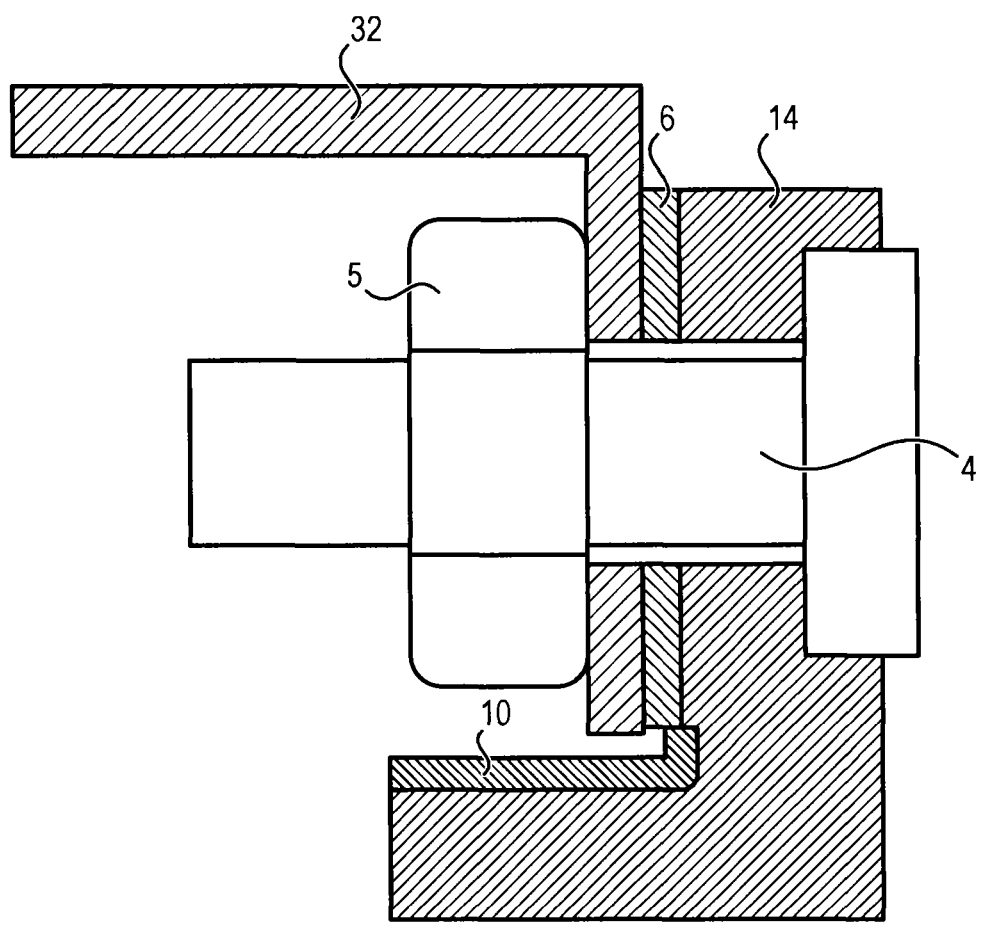
FIG. 4 is an example for affixing a support of electrical equipment to a connecting flange.

In the embodiment illustrated in FIGS. 3a and 3b, the electrical equipment 30 comprises two electrical supports 32g, 32h of pin type, fixed at the level of two opposite sides of the equipment 30 to form two electrical contacts. In a non-limiting way, the electrical equipment 30 can be a computer of PSS type. The downstream support 32g is connected both to the electrical equipment 30 and also to the downstream flange 14 by means of ground braids 16. The upstream support 32h is connected to the electrical equipment 30 by means of a ground braid 16, and to the upstream flange 12 by a metal-metal contact 18. The upstream flange 12 and the downstream flange 14 are then connected respectively to the air inlet sleeve 3 and the intermediate housing 2.

By way of variant, the support 32g could be connected by a metal-metal contact 18 to the downstream flange 14, while the support 32h is connected to the flange 12 by a ground braid 16.

It is understood of course that the choice of metal support 32 used for evacuation of electrical energy from the electrical equipment 30 to one or the other of the upstream 12 or downstream flanges 14 is not limiting.

Also, the fastening supports 32 are preferably fixed in an area adjacent to the flange 12, 14 to which they are likely to be connected, to limit the distance to be covered between the electrical equipment and the structural metallic piece of the corresponding engine 1, specifically the intermediate housing 2 or the air inlet sleeve 3.

To improve the metal-metal contact 18 between the metallic supports 32 and the upstream and downstream flanges, the fibres of the composite material can be at least partially exposed at the level of fastening of the metal support 32 to the relevant flange 12, 14. In this way, the metal support 32 can for example be fixed, by means of a 4-nut screw system 5 or any adapted fastening means, directly to the flange 12, 14, to improve passage of electrical energy to said flange 12, 14. Exposing the fibres can especially be done by local surface scraping of the matrix of the composite material, by machining, etc. Also, a metallic annular spigot 6 can be arranged between the support and the flange 12 and/or 14, in the area of the fan housing 10 where the fibres have been exposed, to further improve metal contact.

The invention claimed is:

1. An aeronautic engine, comprising: a housing, a first metal piece, a second metal piece, and electrical equipment, fixed on the housing and connected to the first metal piece with an electrically conductive connection path, wherein the housing is made of electrically insulating material, and the housing comprises a first connecting flange on a downstream of the engine, adapted to fix the housing to the first metal piece, the electrically conductive connection path being connected to the first metal piece through said first connecting flange; and the electrically conductive connection path further adapted to electrically connect the electrical equipment to an air inlet sleeve comprising the second metal piece, through a second connecting flange located on an upstream of the engine and adapted to fix the second metal piece to the housing.

2. The aeronautic engine according to claim 1, wherein the connection path comprises at least one of the following elements: a metal-metal contact, a ground braid.

3. The aeronautic engine according to claim 2, wherein the metal-metal contact comprises a metal support fixed both to the electrical equipment and also to the first connecting flange.

4. The aeronautic engine according to claim 3, wherein:
the electrically insulating material of the housing comprises a composite material, said composite material comprising a fibrous reinforcement densified by a polymer matrix,
at the level of the contact between the metal support of the electrical equipment and the housing, the fibres of the composite material of the housing are at least partially exposed to improve metal-metal contact between the metal support and the first connecting flange and improve contact between the connection path and the first connecting flange.

5. The aeronautic engine according to claim 1, wherein the electrical equipment comprises at least one of the elements of the following group: a computer, a sensor.

* * * * *